United States Patent
Patel et al.

(10) Patent No.: US 7,080,362 B2
(45) Date of Patent: **\*Jul. 18, 2006**

(54) JAVA VIRTUAL MACHINE HARDWARE FOR RISC AND CISC PROCESSORS

(75) Inventors: Mukesh K. Patel, Fremont, CA (US); Jay Kamdar, Cupertino, CA (US); V. R. Ranganath, Milipitas, CA (US)

(73) Assignee: Nazomi Communication, Inc., Santa Clara, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 09/938,886

(22) Filed: Aug. 24, 2001

(65) Prior Publication Data
US 2002/0066083 A1    May 30, 2002

Related U.S. Application Data

(63) Continuation of application No. 09/208,741, filed on Dec. 8, 1998.

(51) Int. Cl.
*G06F 9/45* (2006.01)

(52) U.S. Cl. ............ 717/139; 717/136; 717/137; 717/118; 712/34; 712/43; 712/203; 712/209

(58) Field of Classification Search ........ 717/136–140, 717/146–149, 151–153, 165, 143, 118; 712/202–203, 712/212, 244, 210, 206–209, 34, 43; 710/29
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,524,416 A | 6/1985 | Stanley et al. | |
| 4,587,612 A | 5/1986 | Fisk et al. | |
| 4,587,632 A | 5/1986 | Ditzel | |
| 4,631,663 A | 12/1986 | Chilinski et al. | |
| 4,763,255 A | 8/1988 | Hopkins et al. | |
| 4,783,738 A | 11/1988 | Li et al. | |
| 4,860,191 A | 8/1989 | Nomura et al. | |
| 4,922,414 A | 5/1990 | Holloway et al. | |
| 4,961,141 A | 10/1990 | Hopkins et al. | |
| 4,969,091 A | 11/1990 | Muller | |
| 5,077,657 A | 12/1991 | Cooper et al. | |
| 5,113,522 A | 5/1992 | Dinwiddie, Jr. et al. | |
| 5,136,696 A | 8/1992 | Beckwith et al. | |
| 5,142,681 A | 8/1992 | Driscoll et al. | |
| 5,163,139 A | 11/1992 | Haigh et al. | |
| 5,193,180 A | 3/1993 | Hastings | |

(Continued)

OTHER PUBLICATIONS

TITLE: Object and Native Code Thread Mobility Among Heterogeneous Computers, author: Steensgarrd et al, ACM, 1995.*

(Continued)

*Primary Examiner*—Chameli C. Das
(74) *Attorney, Agent, or Firm*—Hahn and Moodley LLP

(57) ABSTRACT

A hardware Java™ accelerator is provided to implement portions of the Java™ virtual machine in hardware in order to accelerate the operation of the system on Java™ bytecodes. The Java™ hardware accelerator preferably includes Java™ bytecode translation into native CPU instructions. The combination of the Java™ hardware accelerator and a CPU provides a embedded solution which results in an inexpensive system to run Java™ programs for use in commercial appliances.

99 Claims, 9 Drawing Sheets

U.S. PATENT DOCUMENTS

| | | | |
|---|---|---|---|
| 5,201,056 A | 4/1993 | Daniel et al. | |
| 5,218,711 A | 6/1993 | Yoshida | |
| 5,241,636 A | 8/1993 | Kohn | |
| 5,265,206 A | 11/1993 | Shackelford et al. | |
| 5,307,492 A | 4/1994 | Benson | |
| 5,313,614 A | 5/1994 | Goettelmann et al. | |
| 5,333,296 A | 7/1994 | Bouchard et al. | |
| 5,335,344 A | 8/1994 | Hastings | |
| 5,355,460 A | 10/1994 | Eickemeyer et al. | |
| 5,430,862 A | 7/1995 | Smith et al. | |
| 5,481,684 A | 1/1996 | Richter et al. | |
| 5,490,256 A | 2/1996 | Mooney et al. | |
| 5,524,262 A * | 6/1996 | Colwell et al. | 712/23 |
| 5,535,329 A | 7/1996 | Hastings | |
| 5,542,059 A | 7/1996 | Blomgren | |
| 5,574,927 A | 11/1996 | Scantlin | |
| 5,577,233 A | 11/1996 | Goettelmann et al. | |
| 5,584,026 A | 12/1996 | Knudsen et al. | |
| 5,613,132 A * | 3/1997 | Clift et al. | 712/217 |
| 5,619,665 A | 4/1997 | Emma | |
| 5,619,666 A | 4/1997 | Coon et al. | |
| 5,634,118 A | 5/1997 | Blomgren | |
| 5,638,525 A | 6/1997 | Hammond et al. | |
| 5,650,948 A | 7/1997 | Gafter | |
| 5,659,703 A | 8/1997 | Moore et al. | |
| 5,668,999 A | 9/1997 | Gosling | |
| 5,692,170 A | 11/1997 | Isaman | |
| 5,727,176 A * | 3/1998 | Clift et al. | 712/217 |
| 5,740,441 A | 4/1998 | Yellin et al. | |
| 5,740,461 A | 4/1998 | Jagger | |
| 5,748,964 A | 5/1998 | Gosling | |
| 5,752,035 A | 5/1998 | Trimberger | |
| 5,761,477 A | 6/1998 | Wahbe et al. | |
| 5,764,908 A | 6/1998 | Shoji et al. | |
| 5,768,593 A | 6/1998 | Walters et al. | |
| 5,774,868 A | 6/1998 | Cragun et al. | |
| 5,778,178 A | 7/1998 | Arunachalam | |
| 5,781,750 A | 7/1998 | Blomgren et al. | |
| 5,784,584 A | 7/1998 | Moore et al. | |
| 5,794,068 A | 8/1998 | Asghar et al. | |
| 5,805,895 A | 9/1998 | Breternitz, Jr. et al. | |
| 5,809,336 A | 9/1998 | Moore et al. | |
| 5,838,165 A | 11/1998 | Chatter | |
| 5,838,948 A | 11/1998 | Bunza | |
| 5,875,336 A * | 2/1999 | Dickol et al. | 717/143 |
| 5,889,996 A | 3/1999 | Adams | |
| 5,898,850 A | 4/1999 | Dickol et al. | |
| 5,898,885 A | 4/1999 | Dickol et al. | |
| 5,903,761 A | 5/1999 | Tyma | |
| 5,905,895 A | 5/1999 | Halter | |
| 5,920,720 A | 7/1999 | Toutonghi et al. | |
| 5,923,892 A | 7/1999 | Levy | |
| 5,925,123 A * | 7/1999 | Tremblay et al. | 712/212 |
| 5,926,832 A | 7/1999 | Wing et al. | |
| 5,937,193 A | 8/1999 | Evoy | |
| 5,944,801 A * | 8/1999 | Gulick | 710/29 |
| 5,953,736 A | 9/1999 | O'Connor et al. | |
| 5,953,741 A | 9/1999 | Evoy | |
| 5,983,334 A | 11/1999 | Coon et al. | |
| 5,999,731 A | 12/1999 | Yellin et al. | |
| 6,003,038 A | 12/1999 | Chen | |
| 6,009,499 A | 12/1999 | Koppala | |
| 6,009,511 A * | 12/1999 | Lynch et al. | 712/222 |
| 6,014,723 A | 1/2000 | Tremblay et al. | |
| 6,021,469 A * | 2/2000 | Tremblay et al. | 711/125 |
| 6,026,485 A * | 2/2000 | O'Connor et al. | 712/226 |
| 6,031,992 A | 2/2000 | Cmelik et al. | |
| 6,038,643 A * | 3/2000 | Tremblay et al. | 711/132 |
| 6,052,526 A | 4/2000 | Chatt | |
| 6,065,108 A | 5/2000 | Tremblay et al. | |
| 6,067,577 A | 5/2000 | Beard | |
| 6,075,940 A | 6/2000 | Gosling | |
| 6,076,141 A | 6/2000 | Tremblay et al. | |
| 6,081,665 A | 6/2000 | Nilsen | |
| 6,085,198 A | 7/2000 | Skinner et al. | |
| 6,091,897 A * | 7/2000 | Yates et al. | 717/138 |
| 6,108,768 A | 8/2000 | Koppala et al. | |
| 6,110,226 A | 8/2000 | Bothner | |
| 6,118,940 A | 9/2000 | Alexander, III et al. | |
| 6,122,638 A | 9/2000 | Huber et al. | |
| 6,125,439 A * | 9/2000 | Tremblay et al. | 712/202 |
| 6,131,144 A | 10/2000 | Koppala | |
| 6,131,191 A | 10/2000 | Cierniak et al. | |
| 6,139,199 A | 10/2000 | Rodriguez | |
| 6,141,794 A | 10/2000 | Dice et al. | |
| 6,148,391 A | 11/2000 | Petrick | |
| 6,151,702 A | 11/2000 | Overturf et al. | |
| 6,158,048 A | 12/2000 | Lueh et al. | |
| 6,167,488 A | 12/2000 | Koppala | |
| 6,209,077 B1 | 3/2001 | Robertson et al. | |
| 6,233,678 B1 | 5/2001 | Vasanth | |
| 6,247,171 B1 * | 6/2001 | Yellin et al. | 717/126 |
| 6,275,903 B1 | 8/2001 | Koppala et al. | |
| 6,275,984 B1 | 8/2001 | Morita | |
| 6,292,883 B1 | 9/2001 | Augusteijn et al. | |
| 6,298,434 B1 | 10/2001 | Lindwer | |
| 6,317,872 B1 | 11/2001 | Gee et al. | |
| 6,321,323 B1 | 11/2001 | Hugroho et al. | |
| 6,330,659 B1 | 12/2001 | Poff et al. | |
| 6,349,377 B1 | 2/2002 | Lindwer | |
| 6,374,286 B1 | 4/2002 | Gee et al. | |
| 6,532,531 B1 | 3/2003 | O'Conner et al. | |
| 6,606,743 B1 | 8/2003 | Raz et al. | |
| 6,725,356 B1 * | 4/2004 | Hansen et al. | 712/210 |
| 6,751,665 B1 * | 6/2004 | Philbrick et al. | 709/224 |
| 6,799,269 B1 * | 9/2004 | Dowling | 712/244 |

OTHER PUBLICATIONS

TITLE: Java Byte code to Native Code Translation: The Caffeine Prototype and Preliminary Results, author: Hsieh et al, IEEE, 1996.*

TITLE: Efficient Java VM Just-in-Time Compilation, Krall, IEEE, 1998.*

TITLE: A Comparison of Full and Partial Predicated Execution Support for ILP Processors, author: Mahlke et al, ACM, 1995.*

TITLE: A performance analysis of automatically managed top of stack buffers, author: Stanley et al, ACM, 1987.*

TITLE: The Clipper Processor: Instruction set architecture and implementation, author: Hollingsworth et al, ACM, 1989.*

TITLE: Migrating a CISC Computer Family onto RISC via Object Code Translation, author: Andrews et al, ACM, 1992.*

"Sun says JAVA chips will vastly increase speed, reduce costs to run JAVA programs," *Interactive Daily*, downloaded from the Internet (Dec. 1996).

Andreas Krall, "Efficient JAVA VM Just-In-Time Compilation, " IEEE 1998.

Debaere and Campenhout, "Interpretation and Instruction Path Coprocessing," © 1990 The MIT Press.

"SGI WebForce 02 is a one-stop Web authoring platform," InfoWorld, Jan. 20, 1997.

Krall, et al., "CACAO—A 64-bit Java VM just-in-time compiler," Concurrency: Practice and Experience, vol. 9 (11), pp. 1017-1030, Nov. 1997.

Debaere and Campenhout, "Interpretation and Instruction Path Coprocessing," © 1990 The MIT Press.

R.M. Tomasulo, An Efficient Algorithm For Exploiting Multiple Arithmetic Units, IBM Journal of Research and Development, vol. 11, No. I, Jan. 1967, pp. 25-27.

C. John Glossner and Stamatis Vassiliadis, The DELFT-JAVA Engine: An Introduction, Euro-Par' 97 Parallel Processing. Third International Euro-Par Conference Passau, Germany, Aug. 26-29, 1997 Proceedings, pp. 767-770.

M. Watheq El-Kharashi and Fayez Elguibaly, Java Microprocessors: Computer Architecture Implications, 1997 IEEE Pacific Rim Conference on Communications, Computers and Signal Processing, PACRIM, Victoria, BC, Canada, Aug. 20-22, 1997, pp. 277-280.

A.C. Rose, Hardware JAVA Acdelerator, for the ARM7, Fourth year Undergraduate project in Group d, 1996/1997, pp. 1-48 plus Appendix.

Otto Steinbusch, Designing Hardware to Interpret Virtual Machine Instructions, Department of Electrical Engineering of Eindhoven University of Technology, Philips Semiconductors 1998, Master's Degree Thesis, Feb. 1998.

Andrews, et al., "Migrating a CISC computer family onto RISC via object code translation", *Proceedings of the Fifth International Conference on Architectural Support for Programming Languages and Operating Systems*, 1992.

Berekovic, et al., "Hardware Realization of a Java Vitural Machine for High Performance Multimedia Applications", *IEEE Workshop on Signal Processing Systems 1997*, Jan. 1, 1997.

Deutsch, Peter , et al., "Efficient Implementation of the Smalltalk-80 System", *11th ACM SIGACT-SIGPLAN Symposium on Principles of Programming Languages,* 1984.

ERTL, "A new approach to forth native code generation", *EuroForth Conference Proceedings,* 1992.

ERTL, "Implementation of stack-based languages on register machines", *dissertation*, Apr. 1996.

ERTL, "Stack caching for interpreters", *SIGPLAN*, 1995.

ERTL, "Stack caching for interpreters", *EuroForth Conference Proceedings 1994*.

Glossner, et al., "Delft-Java Link Translation Buffer", *Proceedings of the 24th EUROMICRO conference*, Aug. 1998.

Kieburtz, "A RISC architecture fir symbolic computation", *ACM 1987*.

Maierhofer, et al., "Optimizing stack code", *Forth-Tagung*, 1997.

McGhan, et al., "picoJAVA: A Direct Execution Engine for Java Bytecode", *IEEE*, 1998.

Miyoshi, et al., "Implementation and Evaluation of Real Time Java Threads", *IEEE*, (Jan. 01, 1997).

O'Conner, et al., "picoJava-I: The Java Virtual Machine in Hardware", *IEEE*, Mar. 1997.

Sun Microsystems, "PicoJava 1 Microprocessor Core Architecture", Oct. 1996.

Sun Microsystems, "PicoJava I, Java Processor Core Data Sheet", Dec. 1997.

Ungar, et al., "Architecture of SOAR: Smalltalk on a RISC", *11th Symposium on Computer Architecture* Jun. 1984.

* cited by examiner

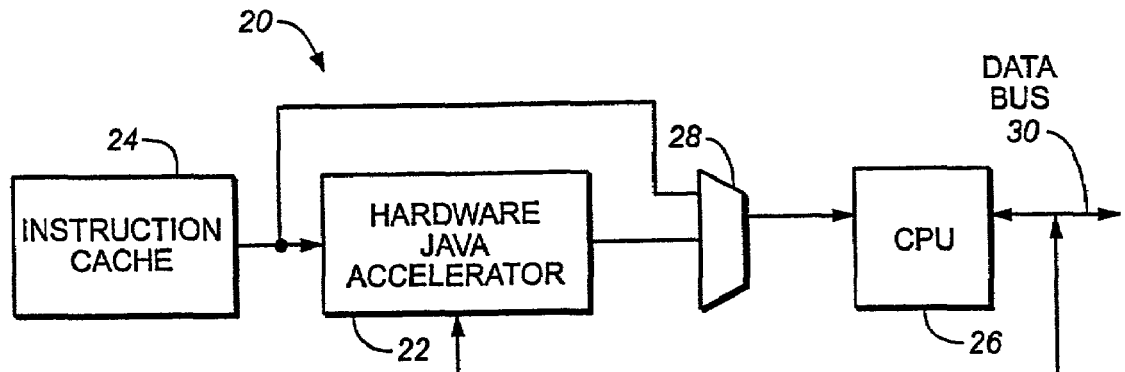
FIG._1
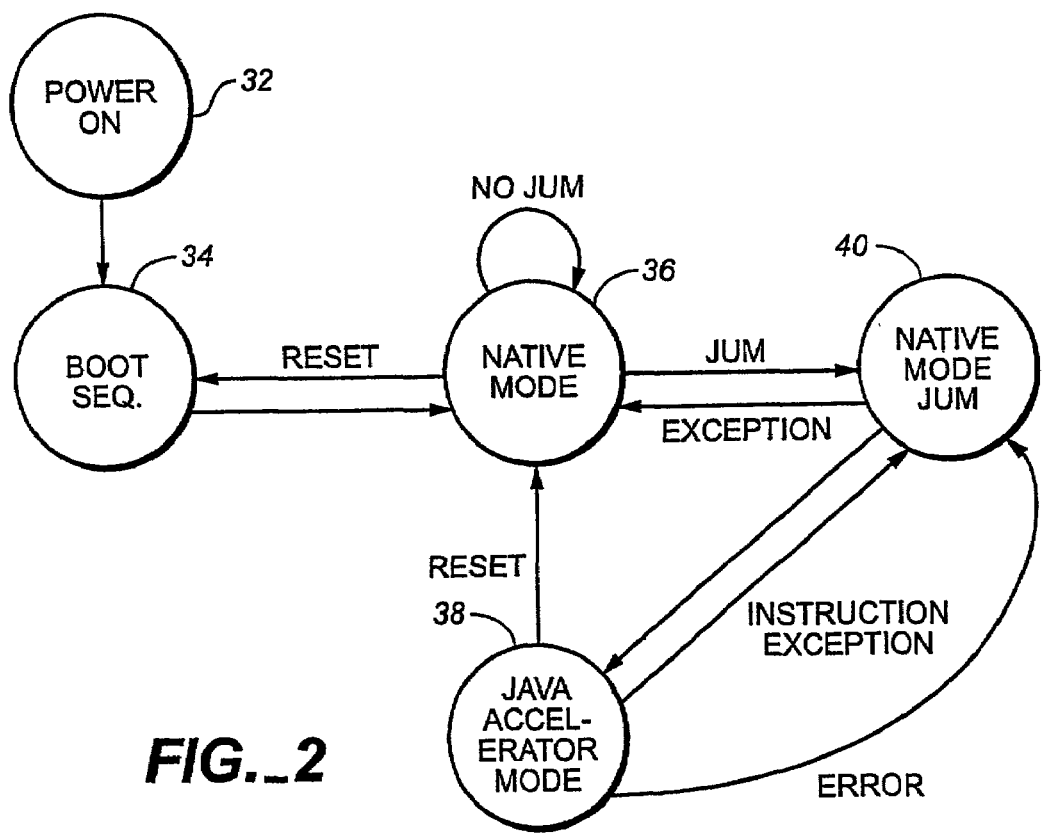
FIG._2

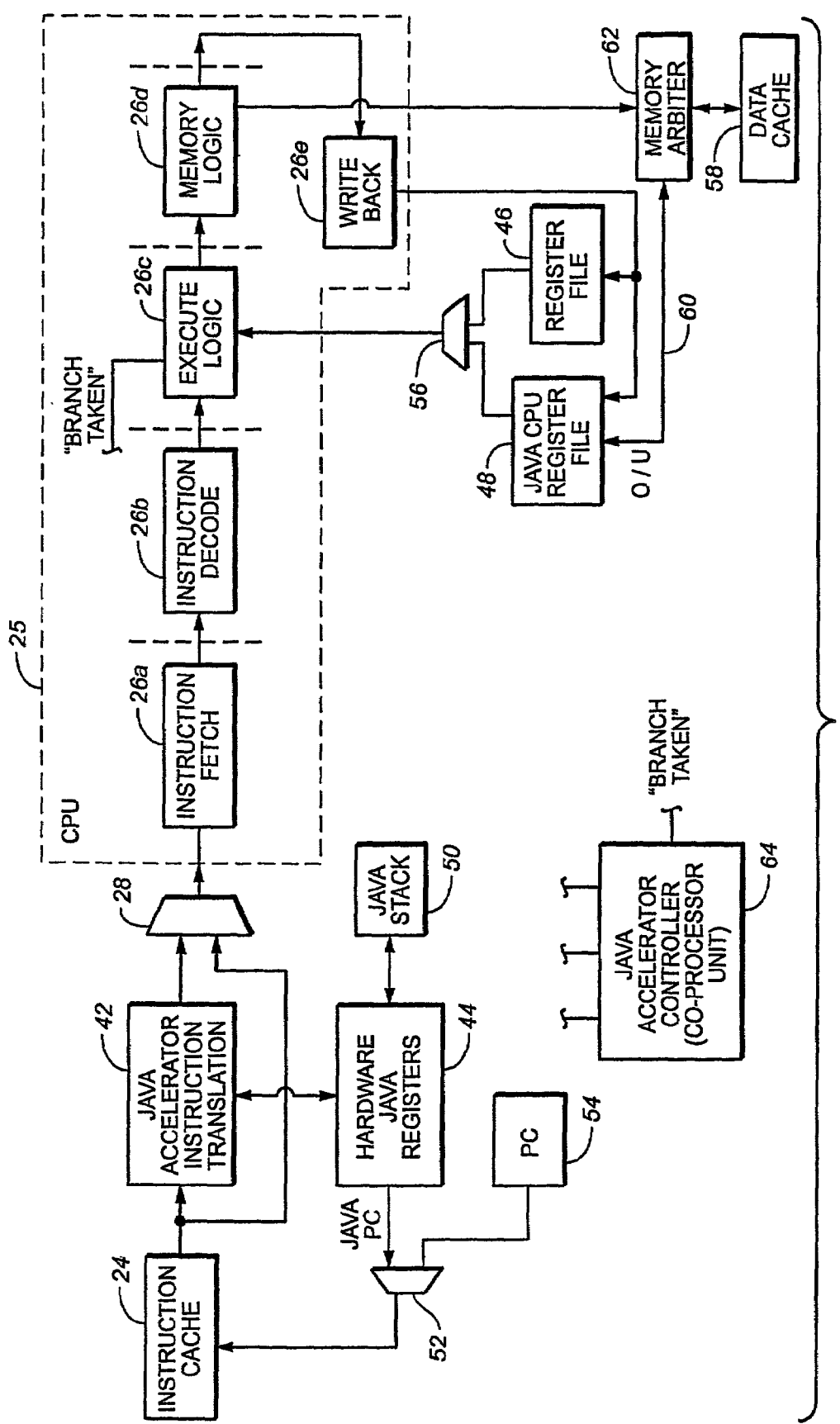
FIG._3

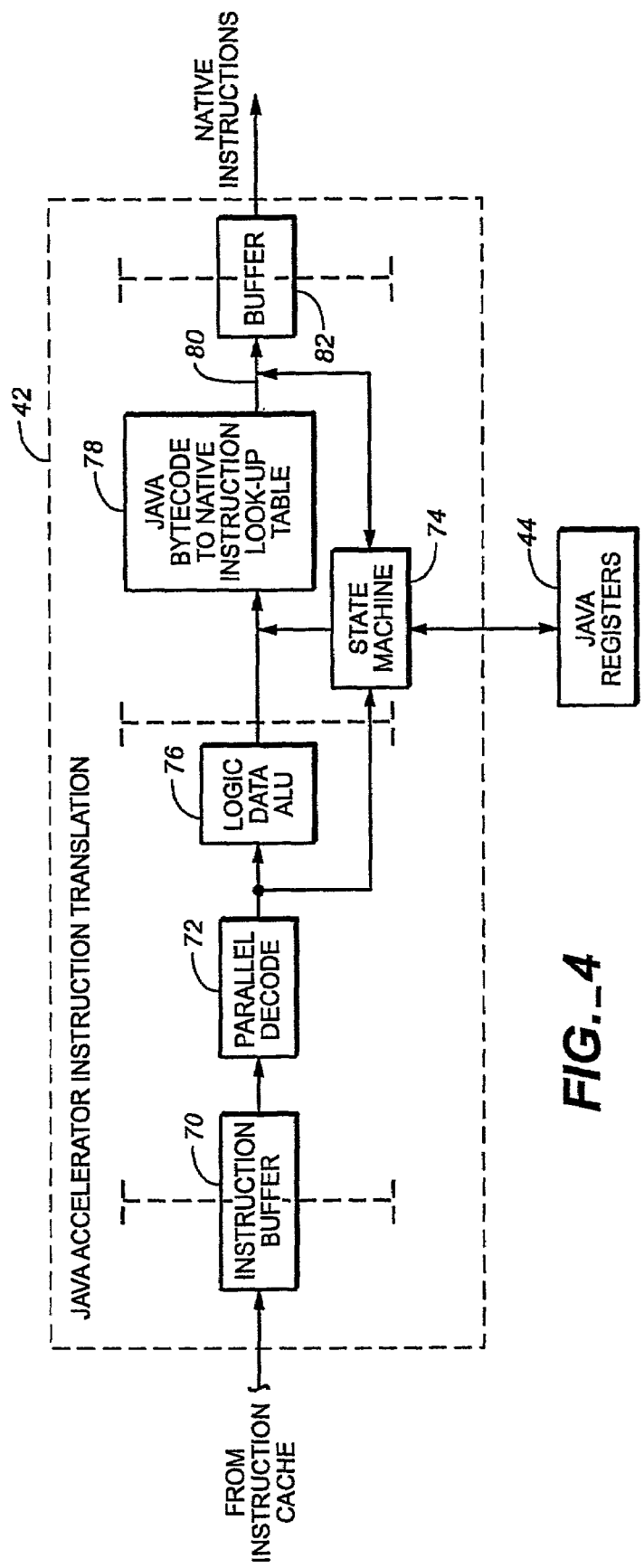
FIG._4

I. INSTRUCTION TRANSLATION

JAVA BYTECODE  NATIVE INSTRUCTION iadd                    ADD R1, R2

II. JAVA REGISTER

PC = VALUE A
OPTOP = VALUE B
(R1)
VAR = VALUE C

PC = VALUE A + 1
OPTOP = VALUE B - 1
(R2)
VAR = VALUE C

III. JAVA CPU REGISTER FILE

CONTAINS VALUE → R1   0150
OF TOP OF           R0   0001
OPERAND STACK       R2   1210
                    R3   0007
                    R4   0005
                    R5   0006
CONTAINS FIRST → R6   1221
VARIABLE            R7   1361

R0   0001
NOT A VALID
STACK VALUE → R1   0150
CONTAINS VALUE → R2   1360
OF THE TOP OF       R3   0007
OPERAND STACK       R4   0005
                    R5   0006
                    R6   1221
                    R7   1361

IV. MEMORY

OPTOP = VALUE B → - 0150
(VALUE B - 1) - 1210
            - 0007
            - 0005
            - 0006
            - 0001
            - 4427

VAR = VALUE C - 1221
            - 1361
            - 1101

- 0150
OPTOP = VALUE B - 1 - 1360
            - 0007
            - 0005
            - 0006
            - 0001
            - 4427

VAR = VALUE C - 1221
            - 1361
            - 1101

*FIG._5*

I. INSTRUCTION TRANSLATION

| JAVA BYTECODE | | NATIVE INSTRUCTION |
|---|---|---|
| iload_n<br>iadd | ⇨ | ADD R6, R1 |

II. JAVA REGISTER

PC = VALUE A
OPTOP = VALUE B
     (R1)
VAR = VALUE C

⇨

PC = VALUE A + 2
OPTOP = VALUE B
     (R1)
VAR = VALUE C

III. JAVA CPU REGISTER FILE

```
                         R0  0001                              R0  0001
    CONTAINS  →  R1  0150                 CONTAINS  →  R1  1371
    VALUE OF     R2  1210                 VALUE OF     R2  1210
     TOP OF      R3  0007        ⇨         TOP OF      R3  0007
OPERAND STACK    R4  0005                   STACK      R4  0005
                         R5  0006                              R5  0006
CONTAINS FIRST → R6  1221                CONTAINS   →  R6  1221
   VARIABLE      R7  1361                  FIRST       R7  1361
                                          VARIABLE
```

IV. MEMORY

```
OPTOP = VALUE B  →  - 0150           OPTOP = VALUE B   - 1371
                    - 1210                             - 1210
                    - 0007     ⇨                       - 0007
                    - 0005                             - 0005
                    - 0006                             - 0006
                    - 0001                             - 0001
                    - 4427                             - 4427
                    ~~~~~~                             ~~~~~~
   VAR = VALUE C  - 1221           VAR = VALUE C   - 1221
                  - 1361                           - 1361
                  - 1101                           - 1101
```

FIG._6

| Opcodes Mnemonic | Opcode xHH | Excep Gen |
|---|---|---|
| nop | 0x00 | |
| aconst_null | x01 | |
| iconst_m1 | x02 | |
| iconst_n(0-5) | x03 - x08 | |
| lconst_n(0-1) | x09 - x0a | |
| fconst_n(0-2) | x0c - x0d | |
| dconst_n(0-1) | x0e -x0f | |
| bipush | x10 | |
| sipush | x11 | |
| ldc | x12 | y |
| ldc_w | x13 | y |
| ldc2_w | x14 | y |
| iload | x15 | |
| lload | x16 | |
| fload | x17 | |
| dload | x18 | |
| aload | x19 | |
| iload_n(0-3) | x1a - x1d | |
| lload_n(0-3) | x1e - x21 | |
| fload_n(0-3) | x22 - x25 | |
| dload_n(0-3) | x26 - x29 | |
| aload_n(0-3) | x2a - x2d | |
| iaload | x2e | |
| laload | x2f | |
| faload | x30 | |
| daload | x31 | |
| aaload | x32 | |
| baload | x33 | |
| caload | x34 | |
| saload | x35 | |
| istore | x36 | |
| lstore | x37 | |
| fstore | x38 | |
| dstroe | x39 | |
| astroe | x3a | |
| istore_n(0-3) | x3b - x3e | |
| lstore_n(0-3) | x3f - x42 | |
| fstore_n(0-3) | x43 - x46 | |
| dstore_n(0-3) | x47 - x4a | |
| astore_n(0-3) | x4b - x4e | |
| iastore | x4f | |
| lastore | x50 | |
| fastroe | x51 | |
| dastore | x52 | |
| bastore | x53 | |
| aastore | x54 | |
| castroe | x55 | |
| sastore | x56 | |

FIG._7A

| | | |
|---|---|---|
| pop | x57 | |
| pop2 | x58 | |
| dup | x59 | |
| dup_x1 | x5a | |
| dup_x2 | x5b | |
| dup2 | x5c | |
| dup2_x1 | x5d | |
| dup2_x2 | x5e | |
| swap | x5f | |
| iadd | x60 | |
| ladd | x61 | |
| fadd | x62 | y |
| dadd | x63 | y |
| isub | x64 | |
| lsub | x65 | |
| fsub | x66 | y |
| dsub | x67 | y |
| imul | x68 | |
| lmul | x69 | |
| fmul | x6a | y |
| dmul | x6b | y |
| idiv | x6c | y |
| ldiv | x6d | y |
| fdiv | x6e | y |
| ddiv | x6f | y |
| irem | x70 | y |
| lrem | x71 | y |
| frem | x72 | y |
| drem | x73 | y |
| ineg | x74 | |
| lneg | x75 | |
| fneg | x76 | y |
| dneg | x77 | y |
| ishl | x78 | |
| lshl | x79 | |
| ishr | x7a | |
| lshr | x7b | |
| iushr | x7c | |
| lushr | x7d | |
| iand | x7e | |
| land | x7f | |
| ior | x80 | |
| lor | x81 | |
| ixor | x82 | |
| lxor | x83 | |
| iinc | x84 | |
| i2l | x85 | y |
| i2f | x86 | y |
| i2d | x87 | y |
| l2i | x88 | y |
| l2f | x89 | y |
| l2d | x8a | y |

*FIG._7B*

| | | |
|---|---|---|
| f2i | x8b | y |
| f2l | x8c | y |
| f2d | x8d | y |
| d2i | x8e | y |
| d2l | x8f | y |
| d2f | x90 | y |
| i2b | x91 | |
| i2c | x92 | |
| i2s | x93 | |
| lcmp | x94 | y |
| fcmpl | x95 | y |
| fcmpg | x96 | y |
| dcmpl | x97 | y |
| dcmpg | x98 | y |
| ifeq | x99 | |
| ifne | x9a | |
| iflt | x9b | |
| ifge | x9c | |
| ifgt | x9d | |
| ifle | x9e | |
| if_icmpeq | x9f | |
| if_icmpne | xa0 | |
| if_icmplt | xa1 | |
| if_acmpge | xa2 | |
| if_cmpgt | xa3 | |
| if_icmple | xa4 | |
| if_acmpeq | xa5 | |
| if_acmpne | xa6 | |
| goto | xa7 | |
| jsr | xa8 | |
| ret | xa9 | |
| tableswitch | xaa | y |
| lookupswitch | xab | y |
| ireturn | xac | |
| lreturn | xad | |
| freturn | xae | |
| dreturn | xaf | |
| areturn | xb0 | |
| return | xb1 | |
| getstatic | xb2 | y |
| putstatic | xb3 | y |
| getfield | xb4 | y |
| putfield | xb5 | y |
| invokevirtual | xb6 | y |
| invokespecial | xb7 | y |
| invokestatic | xb8 | y |
| invokeinterface | xb9 | y |
| xxunusedxxx | xba | y |
| new | xbb | y |
| newarray | xbc | y |
| anewarray | xbd | y |
| arraylength | xbe | y |

*FIG. 7C*

| | | |
|---|---|---|
| athrow | xbf | y |
| checkcast | xc0 | y |
| instanceof | xc1 | y |
| monitorenter | xc2 | y |
| monitorexit | xc3 | y |
| wide | xc4 | y |
| multianewarray | xc5 | y |
| ifnull | xc6 | y |
| ifnonnull | xc7 | y |
| goto_w | xc8 | |
| jsr_w | xc9 | |
| | | |
| | | |
| ldc_quick | xcb | y |
| ldc_w_quick | xcc | y |
| ldc2_w_quick | xcd | y |
| getfield_quick | xce | y |
| putfield_quick | xcf | y |
| getfield2_quick | xd0 | y |
| putfield2_quick | xd1 | y |
| getstatic_quick | xd2 | y |
| putstatic_quick | xd3 | y |
| gtestatic2_quick | xd4 | y |
| putstatic2_quick | xd5 | y |
| invokevirtual_quick | xd6 | y |
| invokenonvirtual_quick | xd7 | y |
| invokesuper_quick | xd8 | y |
| invokestatic_quick | xd9 | y |
| invokeinterface_quick | xda | y |
| invokevirtualobject_quick | xdb | y |
| new_quick | xdc | y |
| anewarray_quick | xde | y |
| multinewarray_quick | xdf | y |
| checkcast_quick | xe0 | y |
| instanceof_quick | xe1 | y |
| invokevirtual_quick_w | xe2 | y |
| getfield_quick_w | xe3 | y |
| putfield_quick_w | xe4 | y |
| | | |
| | | |
| breakpoint | xca | y |
| impdep1 | xfe | y |
| impdep2 | xff | y |

*FIG._7D*

JAVA VIRTUAL MACHINE HARDWARE FOR RISC AND CISC PROCESSORS

This application is a continuation of application Ser. No. 09/208,741 Dec. 8, 1998.

BACKGROUND OF THE INVENTION

Java™ is an object orientated programming language developed by Sun Microsystems. The Java™ language is small, simple and portable across platforms and operating systems, both at the source and at the binary level. This makes the Java™ programming language very popular on the Internet.

Java™'s platform independence and code compaction are the most significant advantages of Java™ over conventional programming languages. In conventional programming languages, the source code of a program is sent to a compiler which translates the program into machine code or processor instructions. The processor instructions are native to the system's processor. If the code is compiled on an Intel-based system, the resulting program will only run on other Intel-based systems. If it is desired to run the program on another system, the user must go back to the original source code, obtain a compiler for the new processor, and recompile the program into the machine code specific to that other processor.

Java™ operates differently. The Java™ compiler takes a Java™ program and, instead of generating machine code for a particular processor, generates bytecodes. Bytecodes are instructions that look like machine code, but aren't specific to any processor. To execute a Java™ program, a bytecode interpreter takes the Java™ bytecode converts them to equivalent native processor instructions and executes the Java™ program. The Java™ byte code interpreter is one component of the Java™ Virtual Machine.

Having the Java™ programs in bytecode form means that instead of being specific to any one system, the programs can run on any platform and any operating system as long a Java™ Virtual Machine is available. This allows a binary bytecode file to be executable across platforms.

The disadvantage of using bytecodes is execution speed. System specific programs that run directly on the hardware from which they are compiled, run significantly faster that Java™ bytecodes, which must be processed by the Java™ Virtual Machine. The processor must both convert the Java™ bytecodes into native instructions in the Java™ Virtual Machine and execute the native instructions.

One way to speed up the Java™ Virtual Machine is by techniques such as the "Just in Time" (JIT) interpreter, and even faster interpreters known as "Hot Spot JITs" interpreters. The JIT versions all result in a JIT compile overhead to generate native processor instructions. These JIT interpreters also result in additional memory overhead.

The slow execution speed of Java™ and overhead of JIT interpreters have made it difficult for consumer appliances requiring local-cost solutions with minimal memory usage and low energy consumption to run Java™ programs. The performance requirements for existing processors using the fastest JITs more than double to support running the Java™ Virtual Machine in software. The processor performance requirements could be met by employing superscalar processor architectures or by increasing the processor clock frequency. In both cases, the power requirements are dramatically increased. The memory bloat that results from JIT techniques, also goes against the consumer application requirements of low cost and low power.

It is desired to have an improved system for implementing Java™ programs that provides a low-cost solution for running Java™ programs for consumer appliances.

SUMMARY OF THE INVENTION

The present invention generally relates to a Java™ hardware accelerator which can be used to quickly translate Java™ bytecodes into native instructions for a central processing unit (CPU). The hardware accelerator speeds up the processing of the Java™ bytecodes significantly because it removes the bottleneck which previously occurred when the Java™ Virtual Machine is run in software on the CPU to translate Java™ bytecodes into native instructions.

In the present invention, at least part of the Java™ Virtual Machine is implemented in hardware as the Java™ hardware accelerator. The Java™ hardware accelerator and the CPU can be put together on a single semiconductor chip to provide an embedded system appropriate for use with commercial appliances. Such an embedded system solution is less expensive than a powerful superscalar CPU and has a relatively low power consumption.

The hardware Java™ accelerator can convert the stack-based Java™ bytecodes into a register-based native instructions on a CPU. The hardware accelerators of the present invention are not limited for use with Java™ language and can be used with any stack-based language that is to be converted to register-based native instructions. Also, the present invention can be used with any language that uses instructions, such as bytecodes, which run on a virtual machine.

BRIEF DESCRIPTION OF THE DRAWINGS

The present invention may be further understood from the following description in conjunction with the drawings.

FIG. 1 is a diagram of the system of the present invention including the hardware Java™ accelerator.

FIG. 2 is a diagram illustrating the use of the hardware Java™ accelerator of the present invention.

FIG. 3 is a diagram illustrating some the details of a Java™ hardware accelerator of one embodiment of the present invention.

FIG. 4 is a diagram illustrating the details of one embodiment of a Java™ accelerator instruction translation in the system of the present invention.

FIG. 5 is a diagram illustration the instruction translation operation of one embodiment of the present invention.

FIG. 6 is a diagram illustrating the instruction translation system of one embodiment of the present invention using instruction level parallelism.

FIGS. 7A–7D are the tables showing the possible lists of bytecodes which can cause exceptions in a preferred embodiment.

DETAILED DESCRIPTION OF THE PREFERRED EMBODIMENTS

FIG. 1 is a diagram of the system 20 showing the use of a hardware Java™ accelerator 22 in conjunction with a central processing unit 26. The Java™ hardware accelerator 22 allows part of the Java™ Virtual Machine to be implemented in hardware. This hardware implementation speeds up the processing of the Java™ byte codes. In particular, in a preferred embodiment, the translation of the Java™ bytecodes into native processor instructions is at least partially done in the hardware Java™ accelerator 22. This translation has been part of a bottleneck in the Java™ Virtual Machine when implemented in software. In FIG. 1, instructions from the instruction cache 24 or other memory is supplied to the hardware Java™ accelerator 22. If these instruction are Java™ bytecode, the hardware Java™ accelerator 22 can convert these bytecodes into native processor instruction which are supplied through the multiplexer 28 to the CPU. If a non-Java™ code is used, the hardware accelerator can be by-passed using the multiplexer 26.

The Java™ hardware accelerator can do, some or all of the following tasks:

1. Java™ bytecode decode;
2. identifying and encoding instruction level parallelism (ILP), wherever possible;
3. translating bytecodes to native instructions;
4. managing the Java™ stack on a register file associated with the CPU or as a separate stack;
5. generating exceptions on instructions on predetermined Java™ byte codes;
6. switching to native CPU operation when native CPU code is provided;
7. performing bounds checking on array instructions; and
8. managing the variables on the register file associated with the CPU.

In a preferred embodiment, the Java™ Virtual Machine functions of bytecode interpreter, Java™ register, and Java™ stack are implemented in the hardware Java™ accelerator. The garbage collection heap and constant pool area can be maintained in normal memory and accessed through normal memory referencing.

The major advantages of the Java™ hardware accelerator is to increase the speed in which the Java™ Virtual Machine operates, and allow existing native language legacy applications, software base, and development tools to be used. A dedicated microprocessor in which the Java™ bytecodes were the native instructions would not have accesss to those legacy applications.

Although the Java™ hardware accelerator is shown in FIG. 1 as separate from the central processing unit, the Java™ hardware accelerator can be incorporated into a central processing unit. In that case, the central processing unit has a Java™ hardware accelerator subunit to translate Java™ bytecode into the native instructions operated on by the main portion of the CPU.

FIG. 2 is a state machine diagram that shows the operation of one embodiment of the present invention. Block 32 is the power-on state. During power-on, the multiplexer 28 is set to bypass the Java™ hardware accelerator. In block 34, the native instruction boot-up sequence is run. Block 36 shows the system in the native mode executing native instructions and by-passing the Java™ hardware accelerator.

In block 38, the system switches to the Java™ hardware accelerator mode. In the Java™ hardware accelerator mode, Java™ bytecode is transferred to the Java™ hardware accelerator 22, converted into native instructions then sent to the CPU for operation.

The Java™ accelerator mode can produce exceptions at certain Java™ bytecodes. These bytecodes are not processed by the hardware accelerator 22 but are processed in the CPU 26. As shown in block 40, the system operates in the native mode but the Java™ Virtual Machine is implemented in the CPU which does the bytecode translation and handles the exception created in the Java™ accelerator mode.

The longer and more complicated bytecodes that are difficult to handle in hardware can be selected to produce the exceptions.

FIGS. 7A–7D are the tables showing the possible lists of bytecodes which can cause exceptions in a preferred embodiment.

FIG. 3 is a diagram illustrating details of one embodiment of the Java™ hardware accelerator of the present invention. The Java™ hardware accelerator includes Java™ accelerator instruction translation hardware 42. The instruction translation Unit 42 is used to convert Java™ bytecodes to native instructions. One embodiment of the Java™ accelerator instruction translation hardware 42 is described in more detail below with respect to FIG. 4. This instruction translation hardware 42 uses data stored in hardware Java™ registers 44. The hardware Java™ Registers store the Java™ Registers defined in the Java™ Virtual Machine. The Java™ Registers contain the state of the Java™ Virtual Machine, affect its operation, and are updated after each bytecode is executed. The Java™ registers in the Java™ virtual machine include the PC, the program counter indicating what bytecode is being executed; Optop, a pointer to the top of the operand stack; Frame, a pointer to the execution environment of the current method; and Vars, a pointer to the first local variable available of the currently executing method. The virtual machine defines these registers to be a single 32-bit word wide. The Java™ registers are also stored in the Java™ stack which can be implemented as the hardware Java™ stack 50 or the Java™ stack can be stored into the CPU associated register file.

In a preferred embodiment, the hardware Java™ registers 44 can include additional registers for the use of the instruction translation hardware 42. These registers can include a register indicating a switch to native instructions and a register indicating the version number of the system.

The Java™ PC can be used to obtain bytecode instructions from the instruction cache 24. In one embodiment the Java™ PC is multiplexed with the normal program counter 54 of the central processing unit 26 in multiplexer 52. The normal PC 54 is not used during the operation of the Java™ hardware bytecode translation. In another embodiment, the normal program counter 54 is used as the Java™ program counter.

The Java™ registers are a part of the Java™ Virtual Machine and should not be confused with the general registers 46 or 48 which are operated upon by the central processing unit 26. In one embodiment, the system uses the traditional CPU register file 46 as well as a Java™ CPU register file 48. When native code is being operated upon the multiplexer 56 connects the conventional register file 46 to the execution logic 26c of the CPU 26. When the Java™ hardware accelerator is active, the Java™ CPU register file 48 substitutes for the conventional CPU register file 46. In another embodiment, the conventional CPU register file 46 is used.

As described below with respect to FIGS. 3 and 4, the Java™ CPU register file 48, or in an alternate embodiment the conventional CPU register file 46, can be used to store portions of the operand stack and some of the variables. In this way, the native register-based instructions from the Java™ accelerator instruction translator 42 can operate upon the operand stack and variable values stored in the Java™ CPU register file 48, or the values stored in the conventional CPU register file 46. Data can be written in and out of the Java™ CPU register file 48 from the data cache or other memory 58 through the overflow/underflow line 60 connected to the memory arbiter 62. The overflow/underflow transfer of data to and from the memory to can done concurrently with the CPU operation. Alternately, the overflow/underflow transfer can be done explicitly while the CPU is not operating. The overflow/underflow bus 60 can be implemented as a tri-state bus or as two separate buses to read data in and write data out of the register file when the Java™ stack overflows or underflows.

The register files for the CPU could alternately be implemented as a single register file with native instructions used to manipulate the loading of operand stack and variable values to and from memory. Alternately, multiple Java™ CPU register files could be used: one register file for variable values, another register file for the operand stack values, and another register file for the Java™ frame stack holding the method environment information.

The Java™ accelerator controller (co-processing unit) 64 can be used to control the hardware Java™ accelerator, read in and out from the hardware Java™ registers 44 and Java™ stack 50, and flush the Java™ accelerator instruction translation pipeline upon a "branch taken" signal from the CPU execute logic 26c.

The CPU 26 is divided into pipeline stages including the instruction fetch 26a, instruction decode 26b, execute logic 26c, memory access logic 26d, and writeback logic 26e. The execute logic 26c executes the native instructions and thus can determine whether a branch instruction is taken and issue the "branch taken" signal.

FIG. 4 illustrates an embodiment of a Java™ accelerator instruction translator which can be used with the present invention. The instruction buffer 70 stores the bytecode instructions from the instruction cache. The bytecodes are sent to a parallel decode unit 72 which decodes multiple bytecodes at the same time. Multiple bytecodes are processed concurrently in order to allow for instruction level parallelism. That is, multiple bytecodes may be converted into a lesser number of native instructions.

The decoded bytecodes are sent to a state machine unit 74 and Arithmetic Logic Unit (ALU) 76. The ALU 76 is provided to rearrange the bytecode instructions to make them easier to be operated on by the state machine 74. The state machine 74 converts the bytecodes into native instructions using the look-up table 78. Thus, the state machine 74 provides an address which indicates the location of the desired native instruction in the look-up table 78. Counters are maintained to keep a count of how many entries have been placed on the operand stack, as well as to keep track of the top of the operand stack. In a preferred embodiment, the output of the look-up table 78 is augmented with indications of the registers to be operated on at line 80. The register indications are from the counters and interpreted from bytecodes. Alternately, these register indications can be sent directly to the Java™ CPU register file 48 shown in FIG. 3.

The state machine 74 has access to the Java™ registers in 44 as well as an indication of the arrangement of the stack and variables in the Java™ CPU register file 48 or in the conventional CPU register file 46. The buffer 82 supplies the translated native instructions to the CPU.

The operation of the Java™ hardware accelerator of one embodiment of the present invention is illustrated in FIGS. 5 and 6. FIG. 5, section I shows the instruction translation of the Java™ bytecode. The Java™ bytecode corresponding to the mnemonic iadd is interpreted by the Java™ virtual machine as an integer operation taking the top two values of the operand stack, adding them together and pushing the result on top of the operand stack. The Java™ translating machine translates the Java™ bytecode into a native instruction such as the instruction ADD R1, R2. This is an instruction native to the CPU indicating the adding of value in register R1 to the value in register R2 and the storing of this result in register R2. R1 and R2 are the top two entries in the operand stack.

As shown in FIG. 5, section II, the Java™ register includes a PC value of "Value A" that is incremented to "Value A+1". The Optop value changes from "Value B" to "Value B−1" to indicate that the top of the operand stack is at a new location. The Vars value which points to the top of the variable list is not modified. In FIG. 5, section III, the contents of a Java™ CPU register file, such as the Java™ CPU register file 48 in FIG. 3, is shown. The Java™ CPU register file starts off with registers R0–R5 containing operand stack values and registers R6–R7 containing variable values. Before the operation of the native instruction, register R1 contains the top value of the operand stack. Register R6 contains the first variable. After the execution of the native instruction, register R2 now contains the top value of the operand stack. Register R1 no longer contains a valid operand stack value and is available to be overwritten by a operand stack value from the memory sent across the overflow/underflow line 60 or from the bytecode stream.

FIG. 5, section IV shows the memory locations of the operand stack and variables which can be stored in the data cache 58 or in main memory. For convenience, the memory is illustrated without illustrating any virtual memory scheme. Before the native instruction executes, the address of the top of the operand stack, Optop, is "Value B". After the native instruction executes, the address of the top of the operand stack is "Value B−1" containing the result of the native instruction. Note that the operand stack value "4427" can be written into register R1 across the overflow/underflow line 60. Upon a switch back to the native mode, the data in the Java™ CPU register file 48 should be written to the data memory.

Consistency must be maintained between the Hardware Java™ Registers 44, the Java™ CPU register file 48 and the data memory. The CPU 26 and Java™ Accelerator Instruction Translation Unit 42 are pipelined and any changes to the hardware Java™ registers 44 and changes to the control information for the Java™ CPU register file 48 must be able to be undone upon a "branch taken" signal. The system preferably uses buffers (not shown) to ensure this consistency. Additionally, the Java™ instruction translation must be done so as to avoid pipeline hazards in the instruction translation unit and CPU.

FIG. 6 is a diagram illustrating the operation of instruction level parallelism with the present invention. In FIG. 6 the Java™ bytecodes iload_n and iadd are converted by the Java™ bytecode translator to the single native instruction ADD R6, R1. In the Java™ Virtual Machine, iload_n pushes the top local variable indicated by the by the Java™ register VAR onto the operand stack.

In the present invention the Java™ hardware translator can combine the iload_n and iadd bytecode into a single native instruction. As shown in FIG. 6, section II, the Java™ Register, PC, is updated from "Value A" to "Value A+2". The Optop value remains "value B". The value Var remains at "value C".

As shown in FIG. 6, section III, after the native instruction ADD R6, R1 executes the value of the first local variable stored in register R6, "1221", is added to the value of the top of the operand stack contained in register R1 and the result stored in register R1. In FIG. 6, section IV, the Optop value does not change but the value in the top of the register contains the result of the ADD instruction, 1371.

The Java™ hardware accelerator of the present invention is particularly well suited to a embedded solution in which the hardware accelerator is positioned on the same chip as the existing CPU design. This allows the prior existing software base and development tools for legacy applications to be used. In addition, the architecture of the present embodiment is scalable to fit a variety of applications ranging from smart cards to desktop solutions. This scalability is implemented in the Java™ accelerator instruction translation unit of FIG. 4. For example, the lookup table 78 and state machine 74 can be modified for a variety of different CPU architectures. These CPU architectures include reduced instruction set computer (RISC) architectures as well as complex instruction set computer (CISC) architectures. The present invention can also be used with superscalar CPUs or very long instruction word (VLIW) computers.

While the present invention has been described with reference to the above embodiments, this description of the preferred embodiments and methods is not meant to be construed in a limiting sense. For example, the term Java™ in the specification or claims should be construed to cover successor programming languages or other programming languages using basic Java™ concepts (the use of generic instructions, such as bytecodes, to indicate the operation of a virtual machine). It should also be understood that all aspects of the present invention are not to be limited to the specific descriptions, or to configurations set forth herein. Some modifications in form and detail the various embodiments of the disclosed invention, as well as other variations in the present invention, will be apparent to a person skilled in the art upon reference to the present disclosure. It is therefore contemplated that the following claims will cover any such modifications or variations of the described embodiment as falling within the true spirit and scope of the present invention.

We claim:

1. A method for processing instructions in a central processing unit (CPU) capable of executing instructions of a plurality of instruction sets, including a stack-based and a register-based instruction set, the method, comprising:
   maintaining data for register-based instructions from the register-based instruction set and an operand stack for operands associated with stack-based instructions from the stack-based instruction set in a first register file, wherein at least some of the operands are moved between the register file and memory via at least one of an overflow and underflow mechanism;
   maintaining an indication of a depth of the operand stack; and
   processing the register-based instructions including generating a first output, and processing the first output in an execution unit using the data from the first register file; and
   processing the stack-based instructions including generating a second output, and processing the second output in the execution unit using the operands from the first register file; and generating exceptions in respect of selected stack-based instructions.

2. The method of claim 1, further comprising storing variables associated with the stack-based instructions in a second register file.

3. The method of claim 2, further comprising storing virtual machine registers in a third register file.

4. The method of claim 3, wherein the first, second, and third register files are the same register file.

5. The method of claim 4, wherein the operand stack is maintained in a first portion of the register file, and variables associated with the stack-based instructions are maintained in a second portion of the register file.

6. The method of claim 1, wherein the overflow mechanism generates an overflow indication for the stack-based operands.

7. The method of claim 1, wherein the underflow mechanism generates an underflow indication for the stack-based operands.

8. The method of claim 1, further comprising generating a branch taken indication in respect of a selected stack-based branch instruction.

9. The method of claim 8, further comprising flushing at least part of a pipeline associated with the processing of the selected stack-based instructions if the branch taken indication is generated.

10. The method of claim 8, wherein the selected stack-based branch instruction is selected from the group consisting of ifeq, ifne, ifit, ifge, ifgt, ifle, if_icmpeq, if_icmpne, if_icmplt, if_acmpge, if_cmpgt, if_icmple, if_acmpeq, if_acmpne, ifnull, ifnonull, lcmp, fcmpl, fcmpg, dcmpl, and dcmpg.

11. The method of claim 1, wherein a memory arbiter is used to facilitate at least one of a loading and a storing of operands between the register file and the memory via the at least one of the overflow and underflow mechanism.

12. The method of claim 1, wherein at least one of the operands is moved between the register file and the memory as a result of executing at least one of a store and load operation due to at least one of the overflow and underflow indication.

13. The method of claim 11 or claim 12, wherein the memory is a data cache.

14. The method of claim 12, wherein executing the load or the store operation is due to executing a load or a store instruction associated with the register-based instruction set.

15. The method of claim 1, further comprising further processing the selected stack-based instructions for which exceptions were generated using the register-based instruction set.

16. The method of claim 15, wherein the further processing occurs within a virtual machine.

17. The method of claim 15 or claim 16, further comprising reverting to processing the stack-based instructions after the further processing.

18. The method of claim 1, wherein instructions of the stack-based instruction set include virtual machine bytecodes.

19. The method of claim 1, wherein a common program counter register is used for the plurality of instruction sets.

20. The method of claim 1, wherein a program counter for each of the plurality of instruction sets is in at least one or more program counter registers.

21. The method of claim 19 or claim 20, wherein the program counter register is part of a register file for the CPU.

22. The method of claim 1, wherein instructions for the plurality of instruction sets are stored in a shared instruction cache.

23. The method of claim 1, wherein the CPU maintains an indication of which registers in the register file contain operands associated with the stack-based instructions.

24. The method of claim 23, wherein at least a top two operands of the operand stack in the register file are referenced when executing the stack-based instructions.

25. The method of claim 1, further comprising maintaining a counter that counts how many operands are placed in the operand stack.

26. The method of claim 1, further comprising keeping track of the top of the operand stack.

27. A method for processing instructions in a central processing unit (CPU), the method comprising:
decoding instructions of a stack-based instruction set;
maintaining an operand stack for operands associated with the instructions of the stack-based instruction set in a register file including moving at least some operands between the register file and memory via at least one of an overflow and underflow mechanism;
decoding instructions of a register-based instruction set;
maintaining data associated with the instructions of the register-based instruction set in the register file;
sending an output of the decoding of the instructions of the stack and register-based instruction sets, to an execution unit; and
processing the output in the execution unit, including processing exceptions in respect of selected instructions of the stack-based instruction set in a virtual machine.

28. The method of claim 27, further comprising setting at least one bit to indicate which instruction set to use for the processing.

29. The method of claim 28, wherein the processing of the exceptions is performed using the register-based instruction set.

30. The method of claim 28, wherein the at least one bit is set in respect of those instructions of the stack-based instruction set for which an exception is generated.

31. The method of claim 30, further comprising maintaining a program counter for the stack-based instruction set and a program counter for the register-based instruction set in the same register.

32. The method of claim 30, wherein a program counter for instructions of the stack-based and register-based instruction sets are in at least one or more registers.

33. The method of claim 27, wherein the output of decoding-instructions of the stack-based instruction set is sent to the execution unit via the second decode unit.

34. The method of claim 27, wherein a memory arbiter is used to facilitate the loading and storing of operands between the register file and memory via the at least one of an overflow and underflow mechanism.

35. The method of claim 34, wherein the memory includes a data cache.

36. The method of claims 27, further comprising, prior to processing the output in the execution unit, processing the instructions of the stack-based instruction set in a hardware accelerator.

37. The method of claims 36, wherein processing the instructions of stack-based instruction set in the hardware accelerator comprising generating the exceptions, each in respect of a selected instruction of the stack-based instruction set.

38. A method, comprising:
switching a processing system to an accelerator mode, wherein stack-based instructions are executed directly in hardware;
generating an exception in respect of a selected stack-based instruction while in the accelerator mode;
switching the processing system to a first native mode in which the exception is handled within a virtual machine by executing a register-based instruction; and
switching the processing system to a second native mode upon a further exception generated while in the first native mode, wherein in the second native mode the virtual machine is non-operative and handling of the further exception is by executing a register-based instruction.

39. The method of claim 38, wherein the stack-based instructions include virtual machine bytecodes.

40. In a processing system, comprising a central processing unit (CPU) having an execution unit and a register file, and being capable of processing instructions of a plurality of instruction sets including a register-based instruction set and a stack-based instruction set, wherein an operand stack for operands associated with the stack-based instruction set is maintained in the register file, and the operands are moved between the register file and memory due to at least one of an overflow and underflow mechanism, and wherein the processing system further comprises a first state in which the CPU processes instructions using the register-based instruction set without a virtual machine, a second state in which the CPU processes using the non-stack-based instruction set within a virtual machine, and a third state in which the CPU processes instructions using the stack-based instruction set within the virtual machine, a method of operating the CPU comprising:
switching the processing system to the first state due to at least one of a reset command and a power-on condition;
switching the CPU to the second state;
processing instructions in the second state; and
upon encountering an exception while processing the instructions in the second state, switching the CPU to the first state.

41. The method of claim 40, further comprising switching the CPU from the second state to the third state.

42. The method of claim 41, further comprising, upon receiving a reset command, switching the CPU from the third state to the first state.

43. The method of claim 41, further comprising, upon encountering an exception while processing instructions in the third state, switching the CPU from the third state to the second state.

44. The method of claim 41, wherein the switching to the third state is while in a virtual machine to execute the stack-based instruction set.

45. The method of claim 40, further comprising setting at least one bit to indicate to the CPU which instruction set to use.

46. The method of claim 27, claim 38, or claim 40, wherein the stack-based instructions include virtual machine byte codes.

47. The method of claim 1, claim 27, claim 38, or claim 40, wherein the stack-based instruction generating an exception is selected_from the group consisting of tableswitch, lookupswitch, getstatic, putstatic, getfield, putfield, invokevirtual, invokespecial, invokestatic, invokeinterface, new, newarray, arraylength, athrow, checkcast, instanceof, monitorenter, monitorexit, breakpoint, anewarray, imdep1, and imdep2.

48. A central processing unit (CPU), capable of executing a plurality of instruction sets comprising:
an execution unit and associated register file, the execution unit to execute instructions of a plurality of instruction sets, including a stack-based and a register-based instruction set;
a mechanism to maintain at least some data for the plurality of instruction sets in the register file including maintaining an operand stack for the stack-based instructions in the register file and an indication of a depth of the operand stack;

a stack control mechanism that includes at least one of an overflow and underflow mechanism, wherein at least some of the operands are moved between the register file and memory; and a mechanism to generate an exception in respect of selected stack-based instructions.

49. The central processing unit of claim 48, wherein the register file is a first register file, the central processing unit further comprising a second register file to store variables associated with the stack-based instructions.

50. The central processing unit of claim 49, further comprising a third register file to store virtual machine registers.

51. The central processing unit of claim 50, wherein the first, the second, and the third register files are the same register file.

52. The central processing unit of claim 51, wherein the operand stack is maintained in a first portion of the register file, and variables associated with the stack-based instructions are maintained in a second portion of the register file.

53. The central processing unit of claim 48, wherein the overflow mechanism generates an overflow indication for the operand stack.

54. The central processing unit of claim 53, wherein the underflow mechanism generates an underflow indication for the operand stack.

55. The central processing unit of claim 48, further comprising a mechanism to generate a branch taken indication in respect of a selected stack-based instruction.

56. The central processing unit of claim 55, further comprising a mechanism to flush at least part of a pipeline associated with the processing of the selected stack-based instruction, if the branch taken instruction is generated.

57. The central processing unit of claim 48, further comprising a memory arbiter to facilitate at least one of a loading and a storing of operands between the register file and the memory and via the stack control mechanism.

58. The central processing unit of claim 48, wherein the operands are moved between the register file and the memory as a result of executing at least one of a load and a store operation due to at least one of the overflow and underflow indication.

59. The central processing unit of claim 58, wherein executing at least one of the load and store operation is due to executing a load or a store instruction associated with the register-based instruction set.

60. The central processing unit of claim 48, wherein the memory is a data cache.

61. The central processing unit of claim 55, wherein the selected stack-based instruction is selected from the group consisting of ifeq, ifne, iflt, ifge, ifgt, ifle, if_icmpeq, if_icmpne, if_icmplt, if_acmpge, if_cmpgt, if_icmple, if_acmpeq, if_acmpne, ifnull, ifnonull, lcmp, fcmpl, fcmpg, dcmpl, and dcmpg.

62. The central processing unit of claim 48, further comprising further processing the selected stack-based instructions for which exceptions were generated using the register-based instruction set.

63. The central processing unit of claim 62, wherein the further processing occurs within a virtual machine.

64. The central processing unit of claim 63, wherein the execution unit reverts to processing the stack-based instructions, after the further processing.

65. The central processing unit of claim 48, wherein instructions of the stack-based instruction set includes virtual machine bytecodes.

66. The central processing unit of claim 48, further comprising a common program counter register for the plurality of instruction sets.

67. The central processing unit of claim 48, further comprising at least one program counter register to implement a program counter for each of the plurality of instruction sets.

68. The central processing unit of claims 66 or claim 67, wherein at least some of the program counter is implemented within the register file.

69. The central processing unit of claim 48, wherein instructions for the plurality of instruction sets are stored in a shared instruction cache.

70. The central processing unit of claim 48, further comprising a mechanism that maintains an indication of which registers in the register file contain operands associated with the stack-based instructions.

71. The central processing unit of claim 70, wherein at least a top two operands of the operand stack in the register file are referenced when executing the stack-based instructions.

72. The central processing unit of claim 48, further comprising for the instructions of the stack-based instruction set, processing said instructions in a hardware accelerator to process instructions of the stack-back instruction set prior to the processing of said instructions in the execution unit.

73. The central processing unit of claim 72, wherein the hardware accelerator generates the exceptions.

74. A central processing unit (CPU) comprising:
a decoding mechanism to decode instructions of a plurality of instruction sets including a -stack-based instruction set and a register-based instruction set;
a register file, wherein an operand stack to store operands associated with instructions of the stack-based instruction set is maintained; and wherein data associated with instructions of the register-based instruction set is maintained;
at least one of an overflow and underflow mechanism to cause the operands to—be moved between the register file and memory; and
an execution unit that processes the output of the decoding of the instructions of the stack-based instruction set, and the decoding of the instructions of the register-based instruction set, including processing exceptions in respect of selected instructions of the stack-based instruction set within a virtual machine.

75. The central processing unit of claim 74, further comprising a mechanism to set at least one bit to indicate which instruction set is to be used for the processing.

76. The central processing unit of claim 75, wherein the at least one bit is set in respect of those instructions of the stack-based instruction set for which an exception is generated.

77. The central processing unit of claim 75, further comprising a register within which a program counter for the stack-based instruction set and a program counter for the register-based instruction set is maintained.

78. The central processing unit of claim 74, wherein an indication of the depth of the operand stack for the stack-based_instruction set is maintained.

79. The central processing unit of claim 48 or claim 78, further comprising a counter to count how many operands are in the operand stack.

80. The central processing unit of claim 48 or claim 78, further comprising a mechanism to keep track of the top of the operand stack.

81. The central processing unit of claim 74, wherein the decode unit comprises a first subunit and a second subunit, and wherein the first subunit decodes instructions of the stack-based instruction set and sends an output of the decoding to the execution unit via the second subunit.

82. The central processing unit of claim 74, further comprising a memory arbiter that facilitates at least one of the loading or storing of operands between the register file and memory via at least one of an overflow and underflow mechanism.

83. The central processing unit of claim 82, wherein the memory includes a data cache.

84. The central processing unit of claim 74, further comprising for the instructions of the stack-based instruction set, processing said instructions in a hardware accelerator to process instructions of the stack-back instruction set prior to the processing of said instructions in the execution unit.

85. The central processing unit of claim 84, wherein the hardware accelerator generates the exceptions.

86. A processing system, comprising:
an accelerator mode in which a central processing unit (CPU) of the processing system processes stack-based instructions directly in hardware;
a first native mode in which the processing system processes instructions using a non-stack-based instruction set within a virtual machine; and
a second native mode in which the processing system processes instructions using non-stack-based instructions, in which the virtual machine is non-operative, wherein
the processing system is switched to the accelerator mode to process stack-based instructions while in the accelerator mode, the processing of the stack-based instructions including generating an exception in respect of a selected stack-based instruction while in the accelerator mode, and switching to the first native mode in which the selected stack-based instruction for which the exception was generated is further processed within the virtual machine using the non-stack-based instruction set, and wherein if an exception is generated while in the first native mode, the processing system switches to the second native mode.

87. A processing system, comprising:
a central processing unit (CPU) which includes an execution unit and a associated register file, the execution unit to process instructions of a plurality of instructions sets including a register-based instruction set and a stack-based instruction set;
a mechanism to maintain an operand stack for the stack-based instruction set in the register file with at least one of an underflow and overflow mechanism, wherein the processing system has a first state in which the CPU processes instructions using the register-based instruction set without a virtual machine, a second state in which the CPU processes instructions using the register-based instruction set within the virtual machine, and a third state in which the CPU processes instructions using the stack-based instruction set within the virtual machine, the processing system being configured to perform a method, comprising:
switching to the first state due to a reset command while in the third state or after power-on;
thereafter switching to the second state;
processing instructions while in the second state; and
switching to the third state.

88. The processing system of claim 87, wherein upon encountering an exception while in the third state, switching to the second state for further processing.

89. The processing system of claim 88, wherein upon encountering an exception while in the third state, the processing system switches to the second state for further processing of the exception.

90. The processing system of claim 88, wherein due to an exception while in the second state, the processing system switches from the second state to the first state.

91. The processing system of claim 88, wherein the processing system switches to the third state while in the virtual machine to execute the stack-based instruction set.

92. The processing system of claim 88 or claim 91, wherein an exception is generated for selected stack-based instructions.

93. The processing system of claim 91, wherein the stack-based instructions are virtual machine bytecodes.

94. The central processing unit of claim 74, claim 86, or claim 88, wherein the stack-based instruction generating an exception is selected from the group consisting of tableswitch, lookupswitch, getstatic, putstatic, getfield, putfield, invokevirtual, invokespecial, invokestatic, invokeinterface, new, newarray, arraylength, athrow, checkcast, instanceof, monitorenter, monitorexit, breakpoint, anewarray, imdep1, and imdep2.

95. The processing system of claim 87, wherein the processing is done using register-based instructions for the first and second states.

96. The processing system of claim 95, wherein the processing system switches to the third state while in the virtual machine.

97. The processing system of claim 87, wherein an error while in the third state switches the processing system to the second state.

98. The processing system unit of claim 87, further comprising for the instructions of the stack-based instruction set, processing said instructions in a hardware accelerator to process instructions of the stack-back instruction set prior to the processing of said instructions in the execution unit.

99. The processing system unit of claim 98, further comprising for the instructions of the stack-based instruction set, processing said instructions in a hard accelerator to process instructions of the stack-back instruction set prior to the processing of said instructions in the execution unit.

* * * * *